United States Patent [19]

Wintermantel

[11] 4,412,880
[45] Nov. 1, 1983

[54] PROCESS FOR PRODUCING HOLLOW PROFILED STRUCTURES, AND STRUCTURES PRODUCED THEREBY

[76] Inventor: Erich Wintermantel, 10 Elsa-Brandstromstrasse, 5300 Bonn-Bad Godesberg, Fed. Rep. of Germany

[21] Appl. No.: 952,454

[22] Filed: Oct. 18, 1978

Related U.S. Application Data

[63] Continuation-in-part of Ser. No. 695,960, Jun. 14, 1976, Pat. No. 4,132,577.

[30] Foreign Application Priority Data

Jul. 1, 1975 [DE] Fed. Rep. of Germany ....... 2529185

[51] Int. Cl.³ .................... B29C 17/06; B29C 17/07
[52] U.S. Cl. ................................. 156/156; 264/257; 264/314; 264/317; 428/166; 428/178; 428/188
[58] Field of Search ............... 156/156; 264/257, 314, 264/317; 428/166, 178, 188

[56] References Cited

U.S. PATENT DOCUMENTS 3,565,983 2/1971 Eigenmann .................... 264/314

Primary Examiner—James G. Cannon
Attorney, Agent, or Firm—Ross, Ross & Flavin

[57] ABSTRACT

A method of making a hard multi-tubular structure which comprises; producing a flat hose fabric composed of a plurality of side-by-side abutting hoses, introducing uninflated foil tubes into each of the hoses of the fabric, the tubes being of substantially the same length as the length of the fabric, inflating the tubes for expanding the hoses into formed hollow sections, treating the fabric with a hardening material, and allowing a hardening of the hardening material and a setting of the fabric with the hoses in expanded condition. Therefollowing, the tubes are left after the setting of the hose fabric in the respective hollow sections free of any internal inflating pressure. Alternatively, the tubes may be withdrawn from the hollow sections after the setting.

2 Claims, 22 Drawing Figures

PROCESS FOR PRODUCING HOLLOW PROFILED STRUCTURES, AND STRUCTURES PRODUCED THEREBY

RELATIONSHIP

This application is a continuation-in-part of application Ser. No. 695,960 filed June 14, 1976, now U.S. Pat. No. 4,132,577.

FIELD OF THE INVENTION

This invention relates to hard multi-tubular structures, to a method of producing same, and to the use thereof.

SUMMARY OF THE INVENTION

Hard multi-tubular structures consist of several hollow sections connected to one another. The walls of the hollow sections are formed from a woven or knitted fabric which, to maintain a structure in its desired shape, is provided with an impregnation or coating consisting, for example, of a cold-setting or thermo-setting plastic material or like substance or solution which will harden after the impregnating or coating. The fabric may consist of textile threads or bundles thereof. Generally, glass fibers or synthetic fibers or mixtures thereof are used. By appropriate selection of the type, quality and amount of fibers and the impregnation or coating medium, as well as by proper choice of the type of fabric weave, multi-tubular structures of different characteristics, and/or cross-sectional geometries, called "hollow sections" or "hard tube network" and which are open or closed between the fabric meshes formed by the warp threads and weft threads, can be produced.

Such products are frequently used as lightweight construction elements, for example in buildings, for protection against moisture and/or noise and/or against heat and cold. One can use the multi-tubular structures for building a cavity wall or the like having an outer shell as a facade covering or terrace covering which clads and protects the building and gives it its unique appearance.

The multi-tubular structure is installed in front of the usual supporting shell and an outer shell is then applied to the multi-tubular structure which forms a plane of separation between the two shells but at the same time serves as a connecting element, insuring protection against heat and cold, against noise and against damp penetration.

The protection against moisture arises from the fact that the hollow sections extending perpendicularly within the facade or substantially horizontally between the terrace covering and the body of the building communicate respectively by their lowermost, and possibly additionally by their uppermost open ends, with the atmosphere. Any surface water penetrating through the facade or the terrace as far as the plane of separation, and any condensate which may arise from within, through vapour diffusion, can flow away or evaporate into the atmosphere.

The protection against noise emerges from the multi-shell construction and from the attenuation characteristics of the hollow sections as a result of their shapes and properties.

The hollow multi-tubular structure is, moreover, a poor heat conductor, because it has, in comparison with conventional load-bearing building materials, a high volume to weight ratio; it thus serves to provide protection against heat and cold. In this respect, the hard multitubular structure can be formed not only onto flat but also onto arcuate surfaces. The hard multitubular structure can be used, for example, also as trickling body for use in the chemical industry and in cooling tower construction, as a separator in the case of gas and liquid preparation, for gas and water drainage in landscaping and horticulture and as a semi-finished carrying, supporting or core-body product for use in sandwich-like panels or as sound-absorbing element.

The invention makes a start from the problem of producing an inherently-stable hollow multi-tubular structure economically and of so forming it that it can be used in many ways. To solve this problem, the invention provides a method of making a hard multi-tubular structure, which comprises producing a flat hose fabric, woven or knitted so as to be composed of a plurality of side-by-side hoses, expanding the hoses to form them into hollow sections, say tubes, and providing them with a hardening coating or impregnation.

Because use is made of the hose fabric, secure connection together of the hollow sections, formed by expanding or inflation of the tubes, is achieved.

In the hose fabric, the weft threads form respectively the upper part of the wall of the one hollow section and the lower part of the wall of the next adjacent hollow section, and so on across the fabric width. In other words, each weft thread follows, in simplified representation, a sinusoidal course. These weft threads intersect at each junction between two adjacent tubes.

Flat multi-tubular hose fabrics can be produced at a practically high working speed. Starting from such a flat hose fabric, it is proposed by the invention, therefore to expand or inflate the flat hoses into hollow sections, e.g. into tubes, and in so doing, for maintenance of them in their shapes obtained in this way and for increasing their stiffness, to provide the same with a hardening coating or impregnation. The expanding is possible in various ways; depending on the type of expansion, a series of different uses can be achieved.

Thus, in a development of the invention, it is proposed initially to provide the flat hose fabric with a hardening coating, for example by immersing the same in a hardenable liquid or spraying same with such a liquid, and then to expand or inflate the flat hoses of the hose fabric to form them into the hollow sections and to keep them expanded until the hardening reaction of the coating substance has developed sufficiently for the spatial shape of the expanded hollow sections to be ensured.

In further development of the invention the flat hose fabric can first be expanded or blown up, for the forming it into the desired spatial shape, the hardening impregnant or substance then being applied to the expanded hollow sections.

Starting from these two basic propositions, in a further development, it is proposed to introduce inflatable tubes into the flat hose fabric, same being made, for example, of plastics material, and being inflatable to form the hoses into the hollow-sections. The material properties of the inflatable tubes can be such that a secure bond with the hardening coating or impregnation substance may or may not arise. Depending on the intended use of the finished structure, the inflatable tubes may be permeable, vapour-blocking, colored, reflecting, or absorbent.

In a further development of the invention, it is proposed that, simultaneously with the inflation of the inflatable tubes introduced into the hose fabric, insulating substances, such as mineral fibers, may be introduced into the tubes; the inflation and filling of the tubes can also be effected together, for example by injecting a hard or soft foam plastics material therein. The multi-tubular structure, with or without inflatable tubes bonded therein, can be filled wholly or partially, when in the inherently stable state. The multi-tubular structure thus filled, has, for example, increased strength and/or heat insulation and/or damping and/or sound absorption properties, as compared with the non-filled structure, and may, by appropriate selection of the filling, be specifically adapted for particular uses.

In a still further development, the inflatable tubes may consist of a thermoplastic shrink foil. After hardening of the coating or impregnant, it is possible to fix the hollow section shape. The structure is heated so that the inflatable tubes are caused to tear open. In this event, the heating can be applied at one side. If the heating is effected at only one side, in this way, a tubular structure emerges which is particularly suitable for the ground drainage, for example, of sports grounds. Air, water and moisture can penetrate through the structure into the hollow sections formed at their upper sides with numerous apertures and connected together by the weft threads. The air, water or moisture is caused to flow away through the hollow sections because the lower surfaces thereof are closed or sealed by the inflatable tubes and liquids and/or gases can escape into the atmosphere only through the upper part of each such section.

Such a hard multi-tubular structure having numerous apertures at one side only can, however, also be used for other purposes, for example, for insulation against moisture, because the moisture penetrating at one side cannot escape through the opposite closed walls of the tubes. Such a hard structure with a surface which is perforated on one side only can also be produced without a foil insert, for example in such a way that the hardening impregnation or coating on the upper and lower side of the fabric is applied in different thicknesses.

The basic method of the invention can also be so developed that the flat hose fabric is expanded by mandrels instead of by inflatable tubes, in which case the mandrel tool can, of course, be reusable. In this event, the hollow sections comprise an impregnated fabric or coated fabric without a foil or like substance introduced internally for the purposes of the expansion, remaining behind.

In yet another development, it is proposed that the hollow sections should each be expanded or inflated into a rectangular or approximately rectangular or like cross-section. This can be effected by expanding the flat fabric directly into hollow sections with a rectangular shape, approximately rectangular or like shape, possibly by rectangular or substantially rectangular mandrels inserted into the hose fabric or by inflatable tubes introduced into the hose fabric, a surrounding mould having flat, closed, grid-like or other mould faces. The expansion into hollow sections of rectangulara approximately-rectangular or other cross-sectional geometry can, however, be effected by initially expanding the hoses into a circular cross-section and then additionally, before or after partial hardening of the coating to achieve the desired spatial shape, compressing into sections having a rectangular, approximately rectangular or other desired cross-section. A hard multi-tubular structure having a rectangular or approximately rectangular cross-section for its hollow sections has a lesser over-all height and larger contact surfaces between adjacent hollow sections than a comparable structure whose hollow sections are circular. Upon later processing, for example coating with plaster, with a flattened multi-tubular structure, the formation of a plaster layer having regions which are very close to each other, which naturally reduces the insulation capacity through bridge formation, is avoided.

In another development, it is proposed that the hoses should be expanded to circular cross-section and then compressed only over partial regions of their lengths to form them at the compressed regions into hollow sections of rectangular, approximately rectangular or other desired cross-section. Depending on the spacing between the devices used for pressing, the cross-sectional geometry of the portions lying between the compressed regions may also be influenced to a greater or lesser degree.

Another proposal provides for the hose fabric to be impregnated or coated on both sides with materials of different properties, so that a multi-tubular structure with corresponding characteristics is produced.

THE PRIOR ART

The known prior art follows:

| | |
|---|---|
| Sipler | U.S. Pat. No. 2,995,781 of 8-15-61 |
| Norman | U.S. Pat. No. 3,228,822 of 1-11-66 |
| Kreibaum | U.S. Pat. No. 3,307,312 of 3-7-67 |
| Mora | U.S. Pat. No. 3,388,509 of 6-18-68 |
| Corzine | U.S. Pat. No. 3,544,417 of 12-1-70 |
| Reichl | U.S. Pat. No. 3,530,021 of 9-22-70 |
| Zwickert | U.S. Pat. No. 3,560,323 of 2-2-71 |
| Eigenmann | U.S. Pat. No. 3,565,983 of 2-23-71 |
| Ash | U.S. Pat. No. 3,629,030 of 12-21-71 |
| Jenks | U.S. Pat. No. 3,641,230 of 2-8-72 |
| Feucht et al | U.S. Pat. No. 3,813,313 of 5-28-74 |
| Russell | Australia No. 236,548 of 2/1959 |
| Boriolo | France No. 1,335,484 of 7/1963 |
| D.T.A.D. | Belgium No. 630,654 of 7/1963 |

Eigenmann would appear to be the closest reference.

Eigenmann's process uses nearly rigid mandrels to structure the flat fabric into a sheet or tubes. As soon as Eigenmann adds the mandrels to the fabric, he is almost complete, for example up to 95% expanded. Only a small remaining expansion of, for example 5%, occurs through an increase in internal pressure. The mandrels are tools which will be used again.

Contrariwise, the mandrels hereof are foil tubes. They are first flat like a ribbon and can therefore be worked in directly as the fabric is woven. The mandrels are therefore already in the fabric when this is rolled up. Since very thin foil tubes are used, the enlargement of the fabric as the mandrels are worked in is also only a fraction of a percent. Over 99% of the enlargement results from the increase in internal pressure. These characteristics, among others, allow the mandrels to be lost. That is, they can remain in the sheet of tubes and carry out additional functions. It should also be noted that in applicant's case the length of the mandrels corresponds to the fabric or the length of the sheet.

In the references, only Boriolo discloses use of hose fabric of the kind defined herein and his fabric is proposed to be employed in connection with plates in lead acid accumulators.

With Boriolo, the fabric must be made of a synthetic material capable of shrinking upon the application of heat. Circular or square-sectioned moulding bodies 14' and 14" are inserted into the hoses in the fabric. The fabric is then subjected to heat so as to cause shrinkage of the tubes onto the moulding bodies and also to cause setting of a thermosetting resinous material as applied to the components of the fabric before its weaving or as applied to the fabric by impregnating after weaving.

It is essential to Boriolo's process that the shrinkage of the fabric and the setting of the impregnated resin should act in opposition to one another. His reason for this is to obviate occlusion of the pores of the eventually-produced textile network, all to the end that its use in the plates of lead-acid batteries is not impaired.

In the invention at issue, the hoses of the fabric are expanded by inserting tubes which are inflated prior to a hardening of the fabric. The resultant product is for use in a structural panel or a like component which must possess a load-bearing capability. This does not arise in any way in Boriolo's accumulator plate fabric.

This invention is concerned with the shaping of hose fabric by means of "cores" being inflated foil hoses. This procedure has considerable advantages compared with using rigid cores as described by Boriolo.

Cores of foil hoses can practically be put into the hose fabric without friction up to unlimited length by inversion (putting inside out).

Upon producing the fabric, there is also a possibility of interweaving the flat foil hoses, i.e. in their uninflated state, right from the beginning.

These two features have a considerable rationalization effect on the manufacturing of hardened structures made from hose fabrics and practically allow production of such structures of unlimited length.

Upon pulling out the foil cores from the hardened structures under a pressureless condition, practically no frictional forces occur between foil core and structure, for example, when using the inversion technique. Consequently, hardened hoses without core inlay can also be manufactured in almost unlimited lengths.

If the foil hose remains in the hardened tube structure, there will hardly be an increase in weight. The foil hose could additionally function, for example, as an envelope to keep fillings (e.g. mineral wool) tightly in the tube channels.

During the tube structure's process of hardening the threads of the hose fabric are put under tension by inflating the foil hoses, whereby an improvement of the hardened structure's mechanical characteristics is achieved.

Norman cannot be compared to the case at issue because—among other things—the space-providing system consists of single tubes. The core tubes only touch each other; their walls do not merge as it is the case with the system at issue.

Kreibaum teaches a solid plate with built-in holes to put in a filling if need be. Our supporting tubes have a regular wall thickness, while the tubes designated by Kreibaum change their wall thickness over the tubes' circumference, if "tube" and "wall thickness" are actually correct terms to be used in this instance.

In Reichl, neighboring core tubes do not even touch each other actually. In case the shown tubes have no carrying task but the built-in wave band is meant to do the carrying, the supporting construction does not consist of geometrically "closed" bodies but is formed by an "open" wave band.

Corzine comes close inasmuch as also a fabric is used here. But as with Norman, neighboring bodies are glued to each other at their contact surfaces. There is no firm bond. Hence, a failure of this gluing would lead to a failure of the total structure.

Zwickert concerns a largely solid construction. The built-in holes have a relatively great distance from one another. In our opinion, there is no parallel case to the application at issue.

In Australia, the core tubes are positioned at intervals without touching each other. Obviously, the core tubes do not build the supporting construction but this is done by the filling between the tubes.

Belgium concerns a multi-layer construction made from a largely homogeneous material. No fabric is used to build the structure. The shown production process belongs to the fields of extrusion and pulling.

Boriolo concerns a textile hose fabric as do we.

This invention endeavors to focus on the grid-like structure of the fabric. The grid structure allows additional coatings to key themselves into the openings of the grid structure in a push-button or rivet-like way. The result is a mechanical connection between coating and tube structure allowing mathematical stress analyses. Hence, the additional coating is not glued to the tube structure—a fact of great importance with regard to our application. The methods described in our application depict primarily that coatings are put on the outside of the tube structure subsequently. If Boriolo's application is correctly understood, he is focusing on "wrapping up" materials by means of the tube structure, i.e. a filling is put in it.

Actually, the decisive advantages achieved by using the technique hereof based on the circumstances that the hose fabric is opened out by inflatable, thin-walled hoses and that the fabric has a grid texture. Before becoming stabilized by resin, the threads of grid-like fabrics tend to slip out of place and lose shape. The use of core tools to be inserted into the fabric, where inevitably friction will arise between the core and the fabric, is of no use for our purposes, even by disregarding all rationalization advantages.

DETAILED DESCRIPTION

Figure 1:
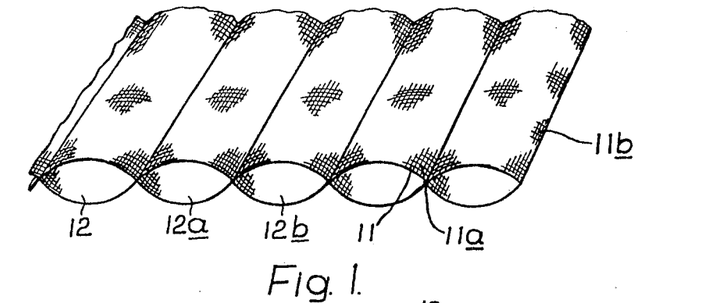
FIG. 1 is a diagrammatic perspective view of a fragment of a length of a flat hose fabric used in carrying out the method of the invention.

FIG. 1 shows a flat hose fabric 10 which comprises a plurality of side-by-side connected hoses and which is shown with the plies of each hose somewhat arched. In practice, the fabric will be understood to be substantially flat. The fabric comprises weft threads 11, 11a, 11b, which extend from left to right and from right to left. These weft threads have sinusoidal configurations so that certain weft threads may lie in the upper half of hose 12, in the lower half of hose 12a and subsequently the upper half of hose 12b and so on, while oppositely woven weft threads may form the lower half of hose 12, the upper half of hose 12a, and the lower half of hose 12b and so forth. The weft threads intersect at the junction lines between adjacent hoses 12, 12a, 12b and so forth.

Figure 1A:
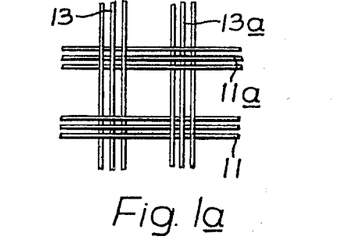
FIG. 1a is an enlarged diagrammatic detail illustrating the intersecting of the warp and weft yarn groups in the FIG. 1 fabric.

Weft threads 11, 11a and so on can be arranged in groups, as in FIG. 1a. Also weft threads 11, 11a, 11b and so on can be incorporated at uniform or non-uniform spacings, as in FIG. 1b.

Figure 1B:
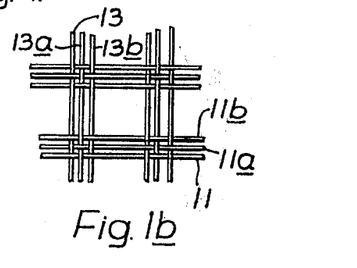
FIG. 1b is a view similar to FIG. 1a but illustrating an alternative possibility for the warp and weft yarn group intersections.

In the same way, warp threads 13, 13a can be present in groups as in FIG. 1a and with uniform or non-uniform spacings as in FIG. 1b. The weave of the fabric can be such that as in FIG. 1a, the groups of weft threads and the groups of warp threads pass alternately under one another and over one another or, as in FIG. 1b, the individual weft threads and individual warp threads alternately pass over and under one another. The type of weave used in the flat hose fabric thus influences the displacement behavior of warp and weft threads in the fabric and the mechanical properties of the eventual resultant multi-tubular structure.

Figure 2:
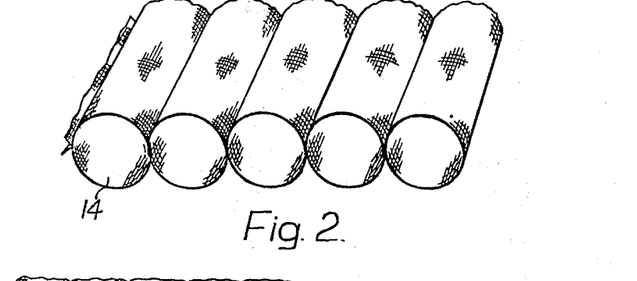
FIG. 2 is a view similar to FIG. 1, and showing the hoses of the fabric expanded to circular cross-section as a step in carrying out the method.

FIG. 2 shows the flat hose fabric of FIG. 1 after expansion of the flat hoses thereof into tubes having a circular cross-section. Prior to or after the shaping from the flat configuration into the expanded shape of FIG. 2, the hose fabric is impregnated or coated with a substance or composition which hardens to form the fabric into the spatial shape shown in FIG. 2. The hardened fabric of FIG. 2 will constitute an elementary embodiment of the hollow multi-tubular structure of the invention which will be suitable for some purposes.

Preferably, a heat-hardening or cold-hardening plastics material is used as the substance for the impregnation or coating.

FIGS. 1 and 2 show, at their right-hand selvedges, that weft threads 11 are conducted back at the longitudinal edge of the hose fabric, along the free edge of the outermost hose thereof, so that the same weft threads form the upper side and the underside of the outer tube, as also is the case with the other tubes. Accordingly, there emerges a particularly secure hold, more especially of the outer tube, since the weft threads are returned through 360°.

Figures 3, 4:
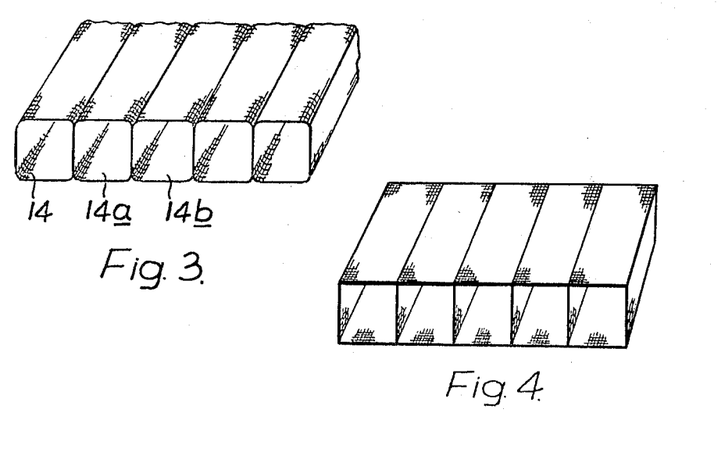
FIG. 3 is a view similar to FIGS. 1 and 2, and showing the fabric after expansion and application of pressure thereto to form the hoses into hollow sections of approximately square cross-section.
FIG. 4 is a view similar to FIG. 3 and showing the hoses as having been compressed to substantially rectangular hollow sections.

FIG. 3 shows how the hollow sections 14, 14a, 14b and so forth of the fabric of FIG. 2 can be reshaped to an approximately rectangular cross-sectional shape, by flattening them at the top and bottom.

The case where an exact rectangular cross-sectional shape is achieved is shown in FIG. 4.

With regard to the cross-sectional shapes in accordance with FIGS. 3 and 4, it should be commented that, in the same way as described with regard to FIG. 1, the weft threads alternately form the upper half of the one hollow section and the lower half of the next adjacent hollow section, so that secure connection of the hollow sections, one with the other, by the weft threads, is afforded.

The expanding of the hoses into sections having a round, angular or other cross-section can be effected in various ways.

Figure 5:
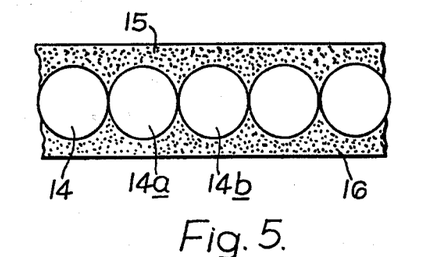
FIG. 5 is a sectional view through a hollow multi-tubular structure comprising the FIG. 2 fabric having a layer of plaster applied to its two opposite sides.
Figure 6:
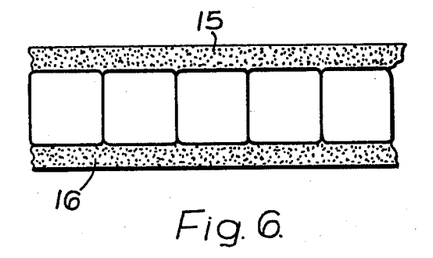
FIG. 6 is a sectional view through a hollow multi-tubular structure comprising the FIG. 3 fabric having a layer of plaster applied to its two opposite sides.

FIG. 5 shows a vertical section through a hard multi-tubular section which comprises a hose fabric, such as that of FIG. 2, hardened and provided on opposite sides with respective plaster layers 15 and 16. When the hoses have a circular cross-section, there emerges between individual hoses 14, 14a and 14b nearly solid x-shaped webs having high strength. At these webs, in other words in the region of adjoining hoses, such as hoses 14 and 14a, through bridge formation between the two sides of the structure, poorer heat insulation is present than in the region of the apices of the tubes. In the case of a hard multi-tubular structure having hollow sections of rectangular cross-section, as in FIG. 6, on the other hand, the insulating capacity is not impaired. In this case, layers 15 and 16 of plaster will have a substantially constant thickness. No bridge formation is present, because the adjacent hollow sections do not contact one another linearly, but aerally. The uniform thickness of layers 15 and 16 of plaster also leads to the fact that these have a substantially equal tension over their surfaces.

Instead of plaster layers 15 and 16, other coverings or coatings can be employed. These coatings 15 and 16 are not, of course, the coating or impregnation of the weft and warp threads which hardens to determine the spatial shape of the hollow sections. Basically, however, both types of coating can be of the same material and be applied in one operation.

Coatings 15 and 16 can be such that they enter into an adhesive bond with the multi-tubular structure. Conversely, the coating or impregnation of the weft and warp threads can be so selected that upon hardening it not only stabilizes the spatial shape of the hollow sections, but at the same time enters into a secure adhesive bond with prepared coatings 15 and 16 already hardened in themselves, for example of metal. Thus the coating can, by way of example, be a composite plate of foam plastics material with an outer metal foil.

Figure 5A:
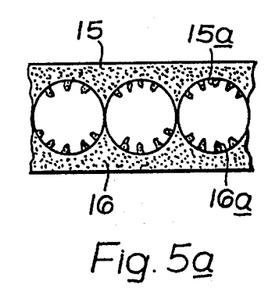
FIG. 5a is a view similar to FIG. 5 but showing a modification in which the applied plaster is caused to protrude through the interstices in the hose fabric to form anchorages to resist separation of the plaster from the hose fabric following setting.
Figure 6A:
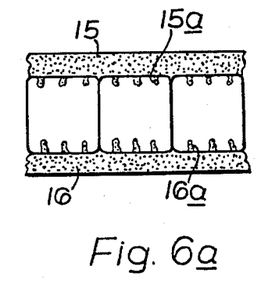
FIG. 6a is a view similar to FIG. 6 but showing a modification in which the applied plaster is caused to protrude through the interstices in the hose fabric to form anchorages.

Coatings 15 and 16, which are applied in the pasty state to the hard multi-tubular structure can, as shown in FIG. 5a and FIG. 6a, penetrate through the interstices in the fabric of the fabric hoses as at 15a and 16a and into the interiors of the hollow sections so as to become mechanically anchored to the multi-tubular structure by formation of knobbed protrusions. The sinusoidal course of the weft threads ensures a positive and interlocking connection between coatings 15 and 16. These coatings are anchored or sewn together by means of the weft threads running through.

Figure 5B:
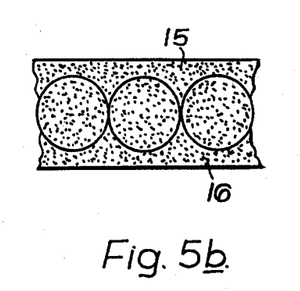
FIG. 5b is a view similar to FIGS. 5 and 5a and showing the plaster having also been filled into the expanded hoses.
Figure 6B:
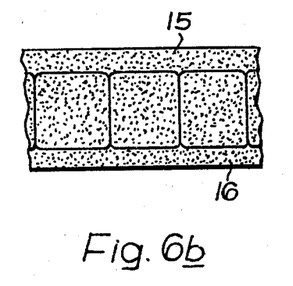
FIG. 6b is a view similar to FIGS. 6 and 6a and showing the plaster having also been filled into the expanded hoses.

The material of coatings 15 and 16 can also, as shown in FIGS. 5b and 6b, be filled into the hollow sections so as completely to fill the spaces of such hollow sections. The coatings 15 and 16 consisting, for example, of a plastics hard or soft foam are then integrally introduced. The coating can, in this case, also be applied only on one side and pass through the apertures in the hard multi-tubular structure as far as the opposite side; in this case, the hard multi-tubular structure is, for example, for the purpose of reinforcing, embedded into the coating material.

Figure 7:
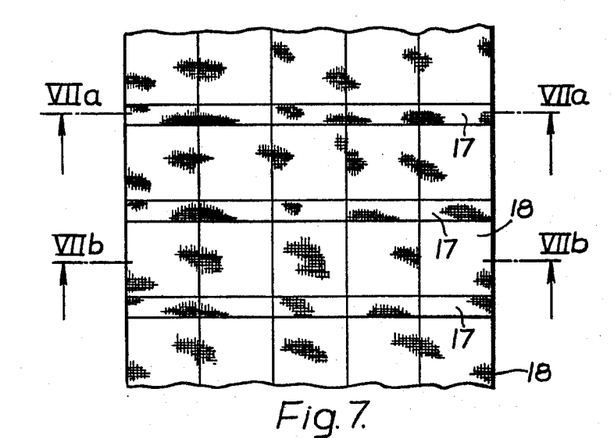
FIG. 7 is a plan view of another embodiment of the hollow multi-tubular structure.
Figure 7A:
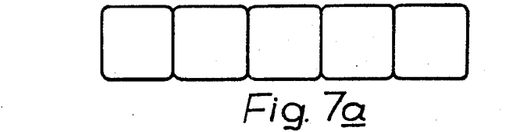
FIG. 7a is a sectional elevation taken on the line VIIa—VIIa of FIG. 7.
Figure 7B:
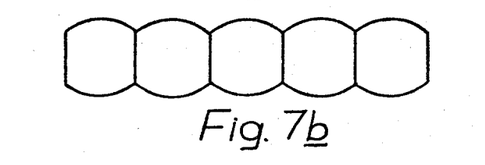
FIG. 7b is a sectional elevation taken on the line VIIb—VIIb of FIG. 7.

FIG. 7 is a plan view of a hard multi-tubular structure of which the hollow sections have different cross-sectional shapes over different parts of their lengths. Thus, in regions 17, as in FIG. 7a, the hollow sections are plane-surfaced at the upper and lower walls, whereas these walls are arcuate in regions 18, as shown by FIG. 7b. The hard multi-tubular structure, with this spatial shape, can be forced more easily into a pasty material, for example into a mortar mess or bed, than hard structures in accordance with FIG. 3 and FIG. 4, by reasons of the fact that the initial penetration is punctiform or linear and not areal.

Figure 8:
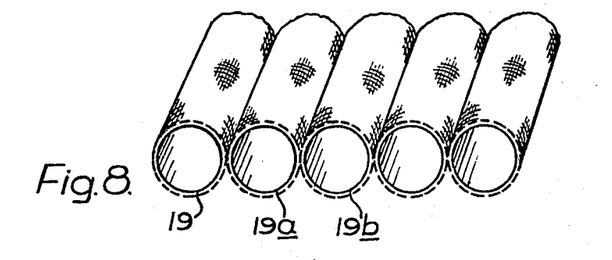
FIG. 8 is a perspective view, similar to FIGS. 2, 3 and 4, but showing an embodiment of the hard multi-tubular structure wherein inserts or tubes of foil are provided in each of the hoses of the fabric.

The expansion of the flat hose fabric can be effected in various ways. It is possible, as shown diagrammatically in FIG. 8, to introduce tubes 19, 19a, 19b and so on, for example made of plastics film, into the hoses of the hose fabric and then to expand these tubes by means of a gas, for example compressed air. In this way, the flat hoses of the fabric are caused to bulge. Prior to, or after, inflation of the tubes, the expanded hose fabric is provided with a coating, which hardens and ensures the spatial shape of the hollow sections formed by the expanded hoses of the fabric. This can be effected by immersing the hose fabric into a synthetic resin bath, by spraying on a cold-hardening or hot-hardening synthetic resin, by spreading on such a resin, or in any other suitable way. The application of the hardening coating can be effected either after or before the introduction of the plastics film tubes.

Figure 8A:
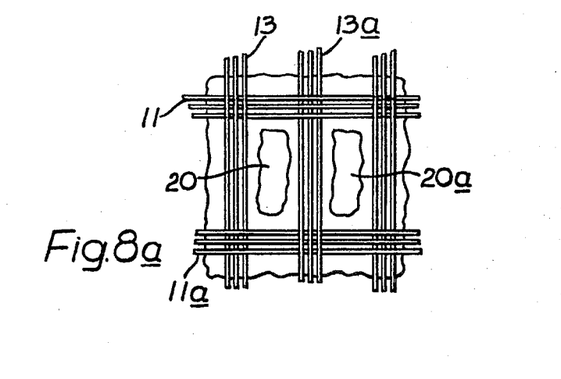
FIG. 8a is an enlarged fragmentary detail illustrating the warp and weft yarn group intersections in the fabric of the FIG. 8 structure showing also the foil inserts or tubes having been caused to tear open in register with the interstices in the hose fabric.

The hoses can be withdrawn, if desired, after they have fulfilled their functions of blowing-up and expanding, and when the hardening of the coating has progressed sufficiently to maintain the spatial shape of the expanded hollow sections. They can alternatively be left to remain in the hard multi-tubular structure and perform further functions. If the plastics tubes consist of a shrink film, heating thereof will result in tearing open of the film in register with the interstices between the groups of weft threads 11 and warp threads 13, as shown in FIG. 8a. If the heating is effected at one side only of the multi-tubular structure, for example only at the upper side thereof, openings 20, 20a and so on arise in register with the fabric interstices only on the upper side of the hoses, whilst the undersides thereof remain closed. A multi-tubular structure of this kind can be used, for example, for drainage. If the impregnation or coating of the hose fabric, to set the spatial shape thereof and for obtaining corresponding stiffness, is effected, for example, using thermosetting plastics materials, the subsequent heating so as to cause the expansion tubes of shrink foil to tear open can be effected simply and without risk of damage to the hollow sections.

Figure 9:
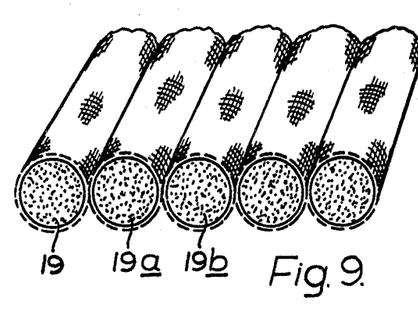
FIG. 9 is a view similar to FIG. 8, but illustrating a modification of the structure in which the expanded hoses have been filled with an insulating material.

FIG. 9 shows a hard multi-tubular structure having film or plastics tubes 19, into which filler, for example insulation material, is introduced. Advantageously, these are introduced with the inflation of the film tubes by way of the inflating air stream. The filler can, for example, consist of mineral fibers. Alternatively, small foam material pellets, granules or chips can be used.

Figure 9A:
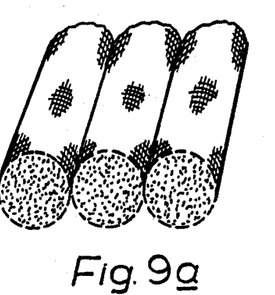
FIG. 9a is a view similar to FIG. 9, but showing an embodiment wherein foil tubes or inserts are not provided in the hoses.

Also foaming materials or rods can be introduced into the expanded hoses of the multi-tubular structure of the invention. FIG. 9a shows a hard multi-tubular structure without any inserted foil tubes, and in which the interiors of the hollow sections are filled with a filler, for example with mineral fibers.

Figure 10:
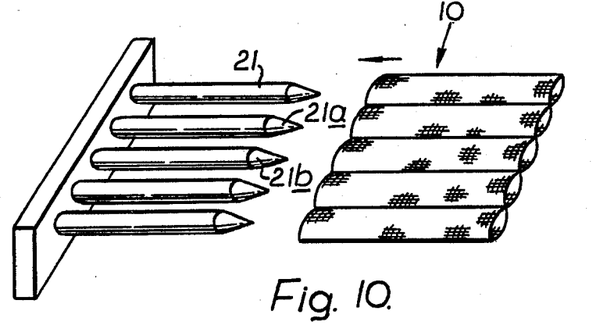
FIG. 10 is a perspective view illustrating how the hoses of the hose fabric can be expanded by means of mandrels.

FIG. 10 shows the introduction of mandrels 21, 21a, 21b or the like into the hose fabric to expand or open up the hoses. The mandrels are advantageously such that, or are so treated that they do not combine with or become adhered or bonded to the hardening impregnation or coating of the hose fabric and can easily be withdrawn once more from the expanded fabric. For the faster hardening of the impregnation or coating, mandrels 21, 21a, 21b and so on can also be heatable.

Figure 11:
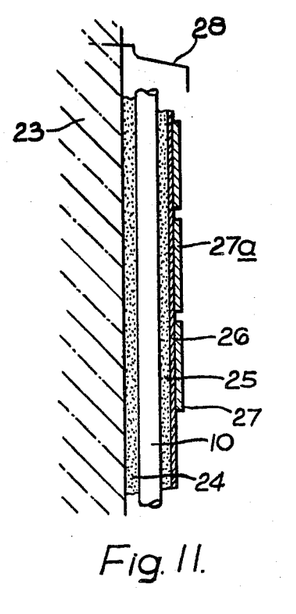
FIG. 11 is a fragmentary sectional side elevation showing how the hollow multi-tubular structures may be used to provide the facade of a building.
Figure 12:
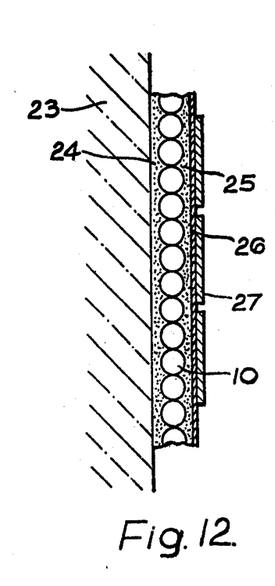
FIG. 12 is a sectional plan view corresponding to FIG. 11.

FIGS. 11 and 12 show an exemplary use of the hard multitubular structure of the invention. Indicated by numeral 23 is a building wall, to which a multi-tubular structure 10 of the invention has been adhered or bonded by a tile adhesive or mortar 24. This structure 10 is faced at its front surface with mortaring 25 which can correspondingly to the plaster layer 15 of the embodiment of FIGS. 5 and 6. Over the structure 10 is applied a frostproof tile adhesive 26 which holds tile coverings 27, 27a and so on. Indicated by numeral 28 is a rain covering which is pervious to air. From FIG. 12 it can be seen that the hollow sections have a circular cross-section and the mortaring 25 has a non-uniform thickness, whilst x-shaped webs are formed between the adjacent hollow sections. These webs are avoided if the hollow sections have the rectangular cross-section shown in FIG. 6.

I claim:

1. A method of making a hard multi-tubular structure which comprises: producing a flat hose fabric composed of a plurality of side-by-side abutting hoses, introducing uninflated foil tubes into each of the hoses of the fabric, the tubes being of substantially the same length as the length of the fabric, treating the fabric with a hardening material, inflating the tubes for expanding the hoses into formed hollow sections, allowing hardening of the hardening material and setting of the fabric with the hoses in expanded condition, and leaving the tubes after setting of the hose fabric in the respective hollow sections free of any internal inflating pressure, the hose fabric being woven with weft threads and warp threads being in groups with spacings present between adjacent pairs of groups.

2. A method of making a hard multi-tubular structure which comprises: producing a flat hose fabric composed of a plurality of side-by-side abutting hoses, introducing uninflated foil tubes into each of the hoses of the fabric, the tubes being of substantially the same length as the length of the fabric, treating the fabric with a hardening material, inflating the tubes for expanding the hoses into formed hollow sections, allowing hardening of the hardening material and setting of the fabric with the hoses in expanded condition, and leaving the tubes after setting of the hose fabric in the respective hollow sections free of any internal inflating pressure, the weft threads and warp threads of the hose fabric being interwoven in a displacement-proof manner at their points of intersection.

* * * * *